(12) United States Patent
Porikli et al.

(10) Patent No.: US 7,899,253 B2
(45) Date of Patent: Mar. 1, 2011

(54) DETECTING MOVING OBJECTS IN VIDEO BY CLASSIFYING ON RIEMANNIAN MANIFOLDS

(75) Inventors: Fatih M. Porikli, Watertown, MA (US); Oncel C. Tuzel, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 928 days.

(21) Appl. No.: 11/763,699

(22) Filed: Jun. 15, 2007

(65) Prior Publication Data
US 2008/0063285 A1    Mar. 13, 2008

Related U.S. Application Data

(63) Continuation-in-part of application No. 11/517,645, filed on Sep. 8, 2006, now Pat. No. 7,724,961.

(51) Int. Cl.
*G06K 9/46* (2006.01)
(52) U.S. Cl. ............... 382/190; 382/224; 382/159
(58) Field of Classification Search ........... 382/159, 382/190, 224
See application file for complete search history.

(56) References Cited

U.S. PATENT DOCUMENTS

| 6,892,193 | B2* | 5/2005 | Bolle et al. ............... 706/20 |
| 7,242,810 | B2* | 7/2007 | Chang .................... 382/227 |
| 7,499,591 | B2* | 3/2009 | Simske et al. ............ 382/224 |
| 7,505,621 | B1* | 3/2009 | Agrawal et al. .......... 382/159 |
| 7,519,217 | B2* | 4/2009 | Liu et al. ................ 382/159 |
| 7,720,289 | B2 | 5/2010 | Porikli et al. |

OTHER PUBLICATIONS

O. Tuzel, F. Porikli, and P. Meer, "Region covariance: A fast descriptor for detection and classification," Proc. European Conf. on Computer Vision, Graz, Austria, vol. 2, pp. 589-600, 2006.
Pennec et al., "A Riemannian framework for tensor computing," In Intl. J. of Computer Vision, vol. 66, pp. 41-66, Jan. 2006.

* cited by examiner

*Primary Examiner* — Stephen R Koziol
(74) *Attorney, Agent, or Firm* — Dirk Brinkman; Gene Vinokur

(57) ABSTRACT

A method constructs a classifier from training data and detects moving objects in test data using the trained classifier. High-level features are generated from low-level features extracted from training data. The high level features are positive definite matrices on an analytical manifold. A subset of the high-level features is selected, and an intrinsic mean matrix is determined. Each high-level feature is mapped to a feature vector on a tangent space of the analytical manifold using the intrinsic mean matrix. An untrained classifier is trained with the feature vectors to obtain a trained classifier. Test high-level features are similarly generated from test low-level features. The test high-level features are classified using the trained classifier to detect moving objects in the test data.

21 Claims, 12 Drawing Sheets

100

500

Input: Training set $\{(\mathbf{X}_i, y_i)\}_{i=1...N}$, $\mathbf{X}_i \in \mathcal{M}$, $y_i \in \{0, 1\}$

- Start with weights $w_i = 1/N$, $i = 1...N$. $F(\mathbf{X}) = 0$ and $p(\mathbf{X}_i) = \frac{1}{2}$
- Repeat for $l = 1...L$
    - Compute the response values and weights
      $$z_i = \frac{y_i - p(\mathbf{X}_i)}{p(\mathbf{X}_i)(1-p(\mathbf{X}_i))}$$
      $w_i = p(\mathbf{X}_i)(1 - p(\mathbf{X}_i))$.
    - Compute weighted mean of the points
      $\boldsymbol{\mu}_l = \arg\min_{\mathbf{Y} \in \mathcal{M}} \sum_{i=1}^{N} w_i d^2(\mathbf{X}_i, \mathbf{Y})$ (12). (*)
    - Map the data points to the tangent space at $\boldsymbol{\mu}_l$
      $\mathbf{x}_i = \text{vec}_{\boldsymbol{\mu}_l}(\log_{\boldsymbol{\mu}_l}(\mathbf{X}_i))$. (*)
    - Fit the function $g_l(x)$ to $\mathbf{x}_i$ by weighted least-square regression of $z_i$ to $\mathbf{x}_i$ using weights $w_i$.
    - Update $F(\mathbf{X}) \leftarrow F(\mathbf{X}) + \frac{1}{2}f_l(\mathbf{X})$ where $f_l$ is defined in (15) and $p(\mathbf{X}) \leftarrow \frac{e^{F(\mathbf{X})}}{e^{F(\mathbf{X})} + e^{-F(\mathbf{X})}}$.
- Output the classifier sign
  $[F(\mathbf{X})] = \text{sign}\left[\sum_{l=1}^{L} f_l(\mathbf{X})\right]$

*FIG. 7*

DETECTING MOVING OBJECTS IN VIDEO BY CLASSIFYING ON RIEMANNIAN MANIFOLDS

RELATED APPLICATION

This application is a Continuation in Part of U.S. patent application Ser. No. 11/517,645, "Method for Classifying Data Using an Analytic Manifold" filed by Porikli et al. on Sep. 8, 2006 now U.S. Pat. No. 7,724,961.

FIELD OF THE INVENTION

The invention relates generally to classifying objects in set of images, and more particularly to detecting humans and vehicles in video using classifiers.

BACKGROUND OF THE INVENTION

Human Detection

Detecting humans in images is considered among the hardest examples of object detection problems. The articulated structure and variable appearance of the human body and clothing, combined with illumination and pose variations, contribute to the complexity of the problem.

Human detection methods can be separated into two groups based on the search method. The first group is based on sequentially applying a classifier at all the possible detection sub windows or regions in an image. A polynomial support vector machine (SVM) can be trained using Haar wavelets as human descriptors, P. Papageorgiou and T. Poggio, "A trainable system for object detection," Intl. J. of Computer Vision, 38(1); 15-33, 2000. That work is extended to multiple classifiers trained to detect human parts, and the responses inside the detection window are combined to give the final decision, A. Mohan, C. Papageorgiou, and T. Poggio, "Example-based object detection in images by components," IEEE Trans. Pattern Anal. Machine Intell., 23(4):349-360, 2001.

In a sequence of images, a real time moving human detection method uses Haar wavelet descriptors extracted from space-time differences, P. Viola, M. Jones, and D. Snow, "Detecting pedestrians using patterns of motion and appearance," IEEE Conf. on Computer Vision and Pattern Recognition, New York, N.Y., volume 1, pages 734-741, 2003. Using AdaBoost, the most discriminative features are selected, and multiple classifiers are combined to form a rejection cascade, such that if any classifier rejects a hypothesis, then it is considered a negative example, Another human detector trains an SVM classifier using a densely sampled histogram of oriented gradients, N. Dalai and B. Triggs, "Histograms of oriented gradients for human detection," Proc. IEEE Conf. on Computer Vision and Pattern Recognition, volume 1, pages 886-893, 2005.

In a similar approach, near real time detection performances is achieved by training a cascade model using histogram of oriented gradients features, Q. Zhu, S. Avidan, M. C. Yell, and K. T. Cheng, "Fast human detection using a cascade of histograms of oriented gradients," Proc. IEEE Conf. on Computer Vision and Pattern Recognition. New York, N.Y., volume 2, pages 1491-1498, 2006.

The second group of methods is based on detecting common parts, and assembling local features of the parts according to geometric constraints to form the final human model. The parts can be represented by co-occurrences of local orientation features and separate detectors can be trained for each part using AdaBoost. Human location can be determined by maximizing the joint likelihood of part occurrences combined according to the geometric relations.

A human detection method for crowded scenes is described by, B. Leibe, E. Seemann, and B. Schiele, "Pedestrian detection in crowded scenes," Proc. IEEE Conf. on Computer Vision and Pattern Recognition, volume 1, pages 878-885, 2005. That method combines local appearance features and their geometric relations with global cues by top-down segmentation based on per pixel likelihoods.

Covariance features are described by O. Tuzel, F. Porikli, and P. Meer, "Region covariance: A fast descriptor for detection and classification," Proc. European Conf. on Computer Vision, volume 2, pages 589-600, 2006, and U.S. patent application Ser. No. 11/305,427, "Method for Constructing Covariance Matrices from Data Features" filed by Porikli et al. on Dec. 14, 2005, incorporated herein by reference. The features can be used for matching and texture classification problems, and was extended to object tracking. F. Porikli, O. Tuzel, and P. Meer, "Covariance tracking using model update based on Lie algebra," In Proc. IEEE Conf. on Computer Vision and Pattern Recognition, New York, N.Y., volume 1, pages 728-735, 2006, and U.S. patent application Ser. No. 11/352,145, "Method for Tracking Objects in Videos Using Covariance Matrices" filed by Porikli et at. on Feb. 9, 2006, incorporated herein by reference. A region was represented by the covariance matrix of image features, such as spatial location, intensity, higher order derivatives, etc. It is not adequate to use conventional machine techniques to train the classifiers because the covariance matrices do not lie on a vector space.

Symmetric positive definite matrices (nonsingular covariance matrices) can be formulated as a connected Riemannian manifold. Methods for clustering data points lying on differentiable manifolds are described by E. Begelfor and M. Werman, "Affine invariance revisited," Proc. IEEE Conf. on Computer Vision and Pattern Recognition, New York, N.Y., volume 2, pages 2087-2094, 2006, R. Subbarao and P. Meer, "Nonlinear mean shift for clustering over analytic manifolds," Proc. IEEE Conf. on Computer Vision and Pattern Recognition, New York, N.Y., volume 1, pages 1168-1175, 2006, and O. Tuzel, R. Subbarao, and P. Meer, "Simultaneous multiple 3D motion estimation via mode finding on Lie groups," Proc. 10th Intl. Conf. on Computer Vision, Beijing, China, volume 1, pages 18-25, 2005, incorporated herein by reference.

Classifiers

Data classifiers have many practical applications in the sciences, research, engineering, medicine, economics, and sociology fields. Classifiers can be used for medical diagnosis, portfolio analysis, signal decoding, OCR, speech and face recognition, data raining, search engines, consumer preference selection, fingerprint identification, and the like, Classifiers can be trained using either supervised or unsupervised learning techniques. In the later case, a model is fit to data without any a priori knowledge of the date, i.e., the input data are essentially a set of random variables with a normal distribution. The invention is concerned with supervised learning, where features are extracted from labeled training data in order to learn a function that maps observations to output.

Generally, a classifier is a mapping from discrete or continuous features X to a discrete set of labels Y. For example, in a face recognition system, features are extracted from images effaces. The classifier then labels each image as being, e.g., either male or female.

A linear classifier uses a linear function to discriminate the features. Formally, if an input to the classifier is a feature vector $\vec{x}$, then an estimated label y is $$y = f(\vec{\omega} \cdot \vec{x}) = f\left(\sum_j \omega_j x_j\right),$$

where $\vec{w}$ is a real vector of weights, and $f$ a function that converts the dot product of the two vectors to the desired output. Often, $f$ is a simple function that maps all values above a certain threshold to "yes" and all other values to "no".

In such a two-class (binary) classification, the operation of the linear classifier "splits" a high-dimensional input space with a hyperplane. All points on one side of the hyperplane are classified as "yes", while the others are classified as "no".

The linear classifier is often used in situations where the speed of classification is an issue, because the linear classifier is often the fastest classifier, especially when the feature vector $\vec{x}$ is sparse.

Riemannian Geometry

Riemannian geometry focuses on the space of symmetric positive definite matrices, see W. M. Boothby, "An Introduction to Differentiable Manifolds and Riemannian Geometry," Academic Press, 2002, incorporated herein by reference. We refer to points lying on a vector space with small bold letters $x \in \Re^m$, whereas points lying on the manifold with capital bold letters $X \in \mathcal{M}$.

Riemannian Manifolds

A manifold is a topological space, which is locally similar to a Euclidean space. Every point on the manifold has a neighborhood for which there exists a homeomorphism, i.e., one-to-one and continuous mapping in both directions, mapping the neighborhood to $\Re^m$. For differentiable manifolds, it is possible to define the derivatives of the curves on the manifold.

In Riemannian geometry, the Riemannian manifold (M, g), is a real differentiable manifold M in which each tangent space is equipped with an inner product g in a manner, which varies smoothly from point to point. This allows one to define various notions such as the length of curves, angles, areas or volumes, curvature, gradients of functions and divergence of vector fields.

A Riemannian manifold can be defined as a metric space, which is isometric to a smooth submanifold of the manifold. A metric space is a set where distances between elements of the set are defined, e.g., a three-dimensional Euclidean space. The metric space is isometric to a smooth submanifold $R^n$ with the induced intrinsic metric, where isometry here is meant in the sense of preserving the length of curves. A Riemannian manifold is an example of an analytic manifold, which is a topological manifold with analytic transition maps.

The inner product structure of the Riemannian manifold is given in the form of a symmetric 2-tensor called the Riemannian metric. The Riemannian metric can be used to interconvert vectors and covectors, and to define a rank-4 Riemannian curvature tensor. Any differentiable manifold can be given a Riemannian structure.

Turning the Riemannian manifold into a metric space is nontrivial. Even though a Riemannian manifold is usually "curved," there is still a notion of "straight line" on the manifold, i.e., the geodesies that locally join points along a shortest path on a curved surface.

At a fixed point, the tangent bundle of a smooth manifold M, or indeed any vector bundle over a manifold, is a vector space, and each such space can carry an inner product. If such a collection of inner products on the tangent bundle of a manifold varies smoothly as one traverses the manifold, then concepts that were defined only point-wise at each tangent space can be extended to yield analogous notions over finite regions of the manifold.

For example, a smooth curve $\alpha(t): [0, 1] \to M$ has tangent vector $\alpha'(t_0)$ in the tangent space $TM(t_0)$ at any point $t_0 \in (0, 1)$, and each such vector has length $\|\alpha'(t_0)\|$, where $\|\cdot\|$ denotes the norm induced by the inner product on $TM(t_0)$. The integral of these lengths gives the length of the curve $\alpha$:

$$L(\alpha) = \int_0^1 \|\alpha'(t)\| dt.$$

In many instances, in order to pass from a linear-algebraic concept to a differential-geometric concept, the smoothness requirement is very important. Every smooth submanifold of $R^n$ has an induced Riemannian metric g. The inner product on each tangent space is the restriction of the inner product on the submanifold $R^n$. In fact, it follows from the Nash embedding theorem, which states that every Riemannian manifold can be embedded isometrically in the Euclidean space $R^n$, all Riemannian manifolds can be realized this way.

The derivatives at a point X on the manifold lies in a vector space $T_X$, which is the tangent space at that point. The Riemannian manifold $\Re^m$ is a differentiable manifold in which each tangent: space has an inner product: $<, >X$, which varies smoothly from point to point. The inner product induces a norm, for the tangent vectors on the tangent space, such that, $\|y\|^2_X = <y, y>X$.

The minimum length curve connecting two points on the manifold is called a geodesic, and the distance between the points d(X, Y) is given by the length of this curve. Let $y \in T_X$ and $X \in \Re^m$. From point X, there exists a unique geodesic starting with the tangent vector y. The exponential map, $\exp_X: T_X \mapsto \mathcal{M}$, maps the vector y to the point reached by this geodesic, and the distance of the geodesic is given by $d(X, \exp_X(y)) = \|y\|X$.

In general, the exponential mapping $\exp_X$ is only one-to-one in a neighborhood of X. Therefore, the inverse mapping $\log_X: \Re^m \mapsto T_X$ is uniquely defined only around the neighborhood of the point X. If for any $Y \in \Re^m$, there exists several y $\in T_X$, such that $Y = \exp_X(y)$, then $\log_X(Y)$ is given by the tangent vector with the smallest: norm. Notice that both operators are point dependent where the dependence is made explicit with the subscript.

SUMMARY OF THE INVENTION

The embodiments of the invention provide a method for detecting objects in images, particularly humans and pedestrians. The method uses covariance matrices as object descriptors. Particular forms of the covariance matrices are constructed using additional motion cues. Because these descriptors do not lie on a vector space, well-known machine learning techniques are not adequate to train a classifier to detect the object. The space of d-dimensional nonsingular covariance matrices is represented as a connected Riemannian manifold. The invention classifies points on a Riemannian manifold by incorporating a priori information about geometry of the search space.

Specifically, a method constructs a classifier from training data and detects moving objects in test data using the trained classifier. High-level features are generated from low-level features extracted from training data. The high level features are positive definite matrices on an analytical manifold. A subset of the high-level features is selected, and an intrinsic mean matrix is determined. Each high-level feature is mapped to a feature vector on a tangent space of the analytical manifold using the intrinsic mean matrix. An untrained classifier is trained with the feature vectors to obtain a trained classifier. Test high-level features are similarly generated from test low-level features. The test high-level features are classified using the trained classifier to detect moving objects in the test data.

BRIEF DESCRIPTION OF THE DRAWINGS

FIG. 7 is pseudo-code of details of a procedure for training a LogitBoost classifier according to an embodiment of the invention.

DETAILED DESCRIPTION OF THE PREFERRED EMBODIMENTS

Classifier Construction and Classification

Figure 1:
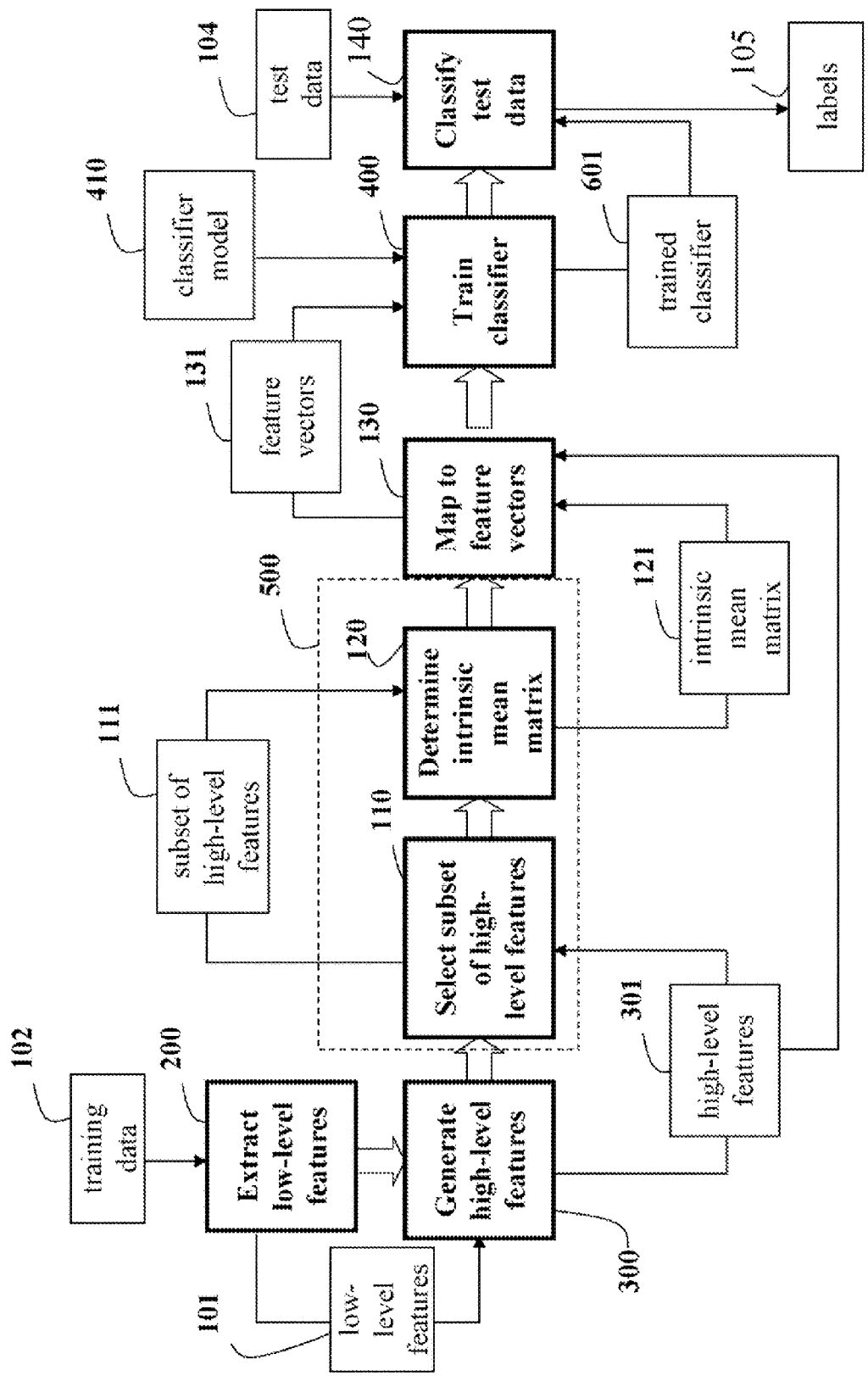
FIG. 1 is a flow diagram of a method for training a classifier for classifying test data according to an embodiment of the invention.

FIG. 1 shows a method 100 for constructing a trained classifier according to an embodiment of our invention. The classifier is constructed and trained using training data. By training data, we mean that the data are already labeled. The training data are used both to extract (labeled) features and to verify or measure a performance of the trained classifier. The trained classifier can then be used to classify test data.

Low-level features 101 are extracted 200 from training data 102. The low-level features 101 are used to generate 300 high-level features 301. The high level-features are the form of positive definite matrices on an analytical manifold.

A subset 111 of the high-level feature 301 is selected 110. The subset 111 of the selected high-level features are used to determine 120 an intrinsic mean covariance matrix 121. The intrinsic mean covariance matrix 121 defines a tangent space of the analytical manifold for the subset of high-level features. Tangent space is a local Euclidean space. The intrinsic mean matrix is used to map (project) 130 each high-level feature 301 to a feature vector 131 in the local Euclidean space of the manifold. Then, the feature vectors 131 are used to train 400 a classifier model 410 to produce the trained classifier 109.

Subsequently, the trained classifier 601 can be used to classify 140 test data 104. The classification assigns labels 105 to the test data. Feature vectors are produces for the test data in the same manner as described above.

Extract Low-Level Features

Figure 2:
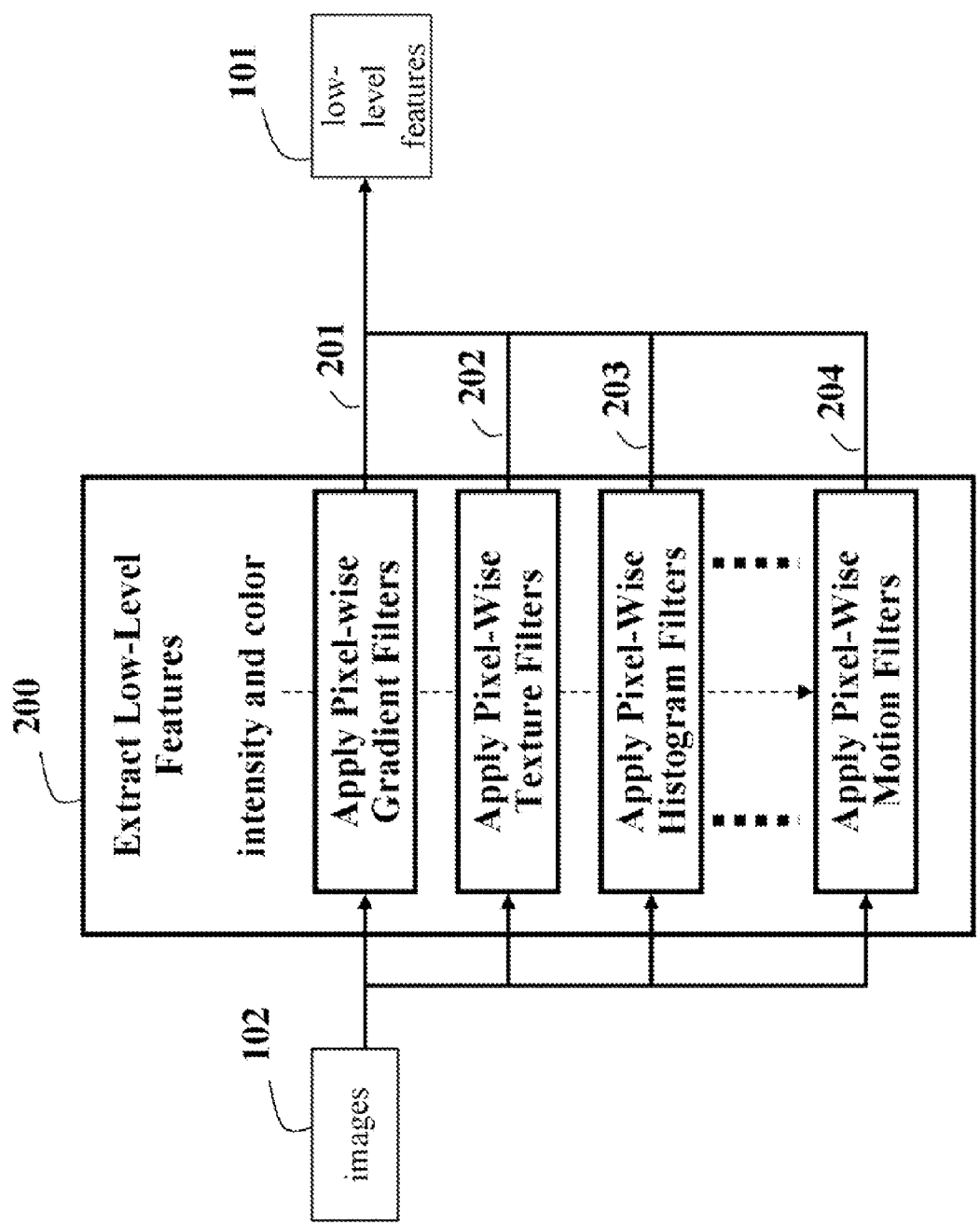
FIG. 2 is a flow diagram of a procedure for extracting low-level features from test data according to an embodiment of the invention.
Figure 3:
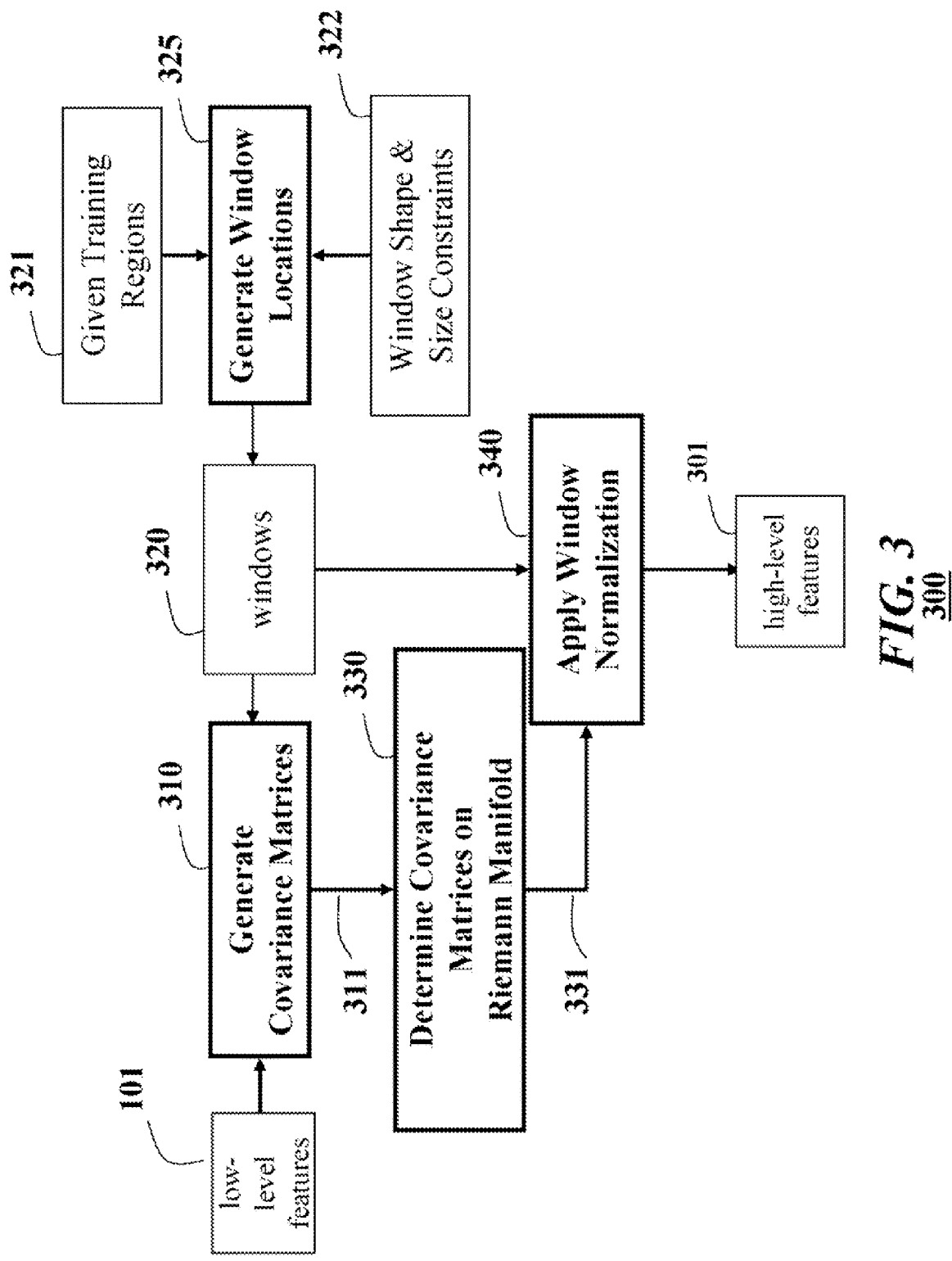
FIG. 3 is a flow diagram of a procedure for converting low-level features to high-level features according to an embodiment of the invention.

FIG. 2 shows the extraction 200 for an example test data 102, e.g., an image or a video. It should be noted that the extraction of low-level features can also be for other data, such as acoustic signal, medical images, data sampled from physical processes, and the like.

The low-level features 101 can include pixel intensities, pixel colors, and derivative low-level features, such as gradients 201, texture 202, color histograms 203, and motion vectors 204.

Generate High-Level Features

The low-level features 101 are used to generate 300 the high-level features 301 on a analytical manifold. In a preferred embodiment, the high-level features are positive definite matrices on a Riemannian manifold, projected onto a tangent space using the intrinsic mean matrix. More specifically the positive definite matrices are covariance matrices of the low-level features. This is done by determining 310 covariance matrices 311 from the low-level features using windows 320.

High-level features in the form of covariance matrices is described generally in U.S. patent application Ser. No. 11/305,427, "Method for Constructing Covariance Matrices From Data Features," filed by Porikli et al, on Dec. 14, 2005, incorporated herein by reference, For objects that are symmetric along one or more axes, we construct high-level features for the image windows that are symmetrical parts along the corresponding axes. For example, for human or face, the objects are symmetrical along a vertical line passing through the center of the image, thus, the high level features are computed in two symmetrical regions along that axis instead of only one region.

Covariance Descriptors

The covariance matrix provides a natural way for combining multiple low-features features that might otherwise be correlated. The diagonal entries of each covariance matrix represent the variance of each high-level feature and the non-diagonal entries represent the correlations of the high-level features. Because covariance matrices do not lie in Euclidean space, that method uses a distance metric involving generalized eigenvalues, which follow from Lie group structures of positive definite matrices.

Covariance descriptors, which we adapt for human detection in images according to embodiments of our invention, can be described as follows. A one-dimensional intensity or three-dimensional color image is I, and a W×H×d dimensional low-level feature image extracted from the image I is $$F(x, y) = \Phi(I, x, y),\qquad(1)$$

where the function $\Phi$ can be any mapping, such as intensity, color, gradients, filter responses, etc. For a given rectangular detection window or region R in the feature image F, the d-dimensional features inside the rectangular region R is $\{z_j\}_{i=1\ldots S}$. The region R is represented with the d×d covariance matrix of the features $$C_R = \frac{1}{S-1}\sum_{i=1}^{S}(z_i-\mu)(z_i-\mu)^T,\qquad(2)$$

where $\mu$ is the mean of the features z, and T is the transform operator.

For the human detection problem, we define the mapping $\Phi(I, x, y)$ as eight (d=8) low-level features $$\left\{ x \ y |I_x| \ |I_y| \sqrt{I_x^2 + I_y^2} \ |I_{xx}| \ |I_{yy}| \ \arctan\frac{|I_x|}{|I_y|} \right\}^T, \quad (3)$$

where x and y are pixel coordinates, $I_x$, $I_{xx}$, ... are intensity derivatives, $\arctan(|I_x|/|I_y|)$ is an edge orientation, and T is the transpose operator.

We can use different type and number of low-level features for detection.

With the defined mapping, the input image is mapped to the eight-dimensional low-level feature image F as defined by Equation (3). The covariance descriptor of the region r is the 8×8 covariance matrix $C_R$. Due to symmetry, only an upper triangular part is stored, which has only 36 different values. The descriptor encodes information of the variances of the defined features inside the region, their correlations with each other, and a spatial layout.

The covariance descriptors can be determined using integral images, O. Tuzel, F. Porikli, and P. Meer, "Region covariance: A fast descriptor for detection and classification," Proc. European Conf. on Computer Vision, Graz, Austria, volume 2, pages 589-600, 2006, incorporated herein by reference.

After constructing d(d+1)/2 integral images, the covariance descriptor of any rectangular region can be determined independent of the size of the region, see Tuzel et al. above. Given an arbitrary sized region R, there are a very large number of covariance descriptors that can be from subregions $r_{1,2,...}$.

Figure 8:
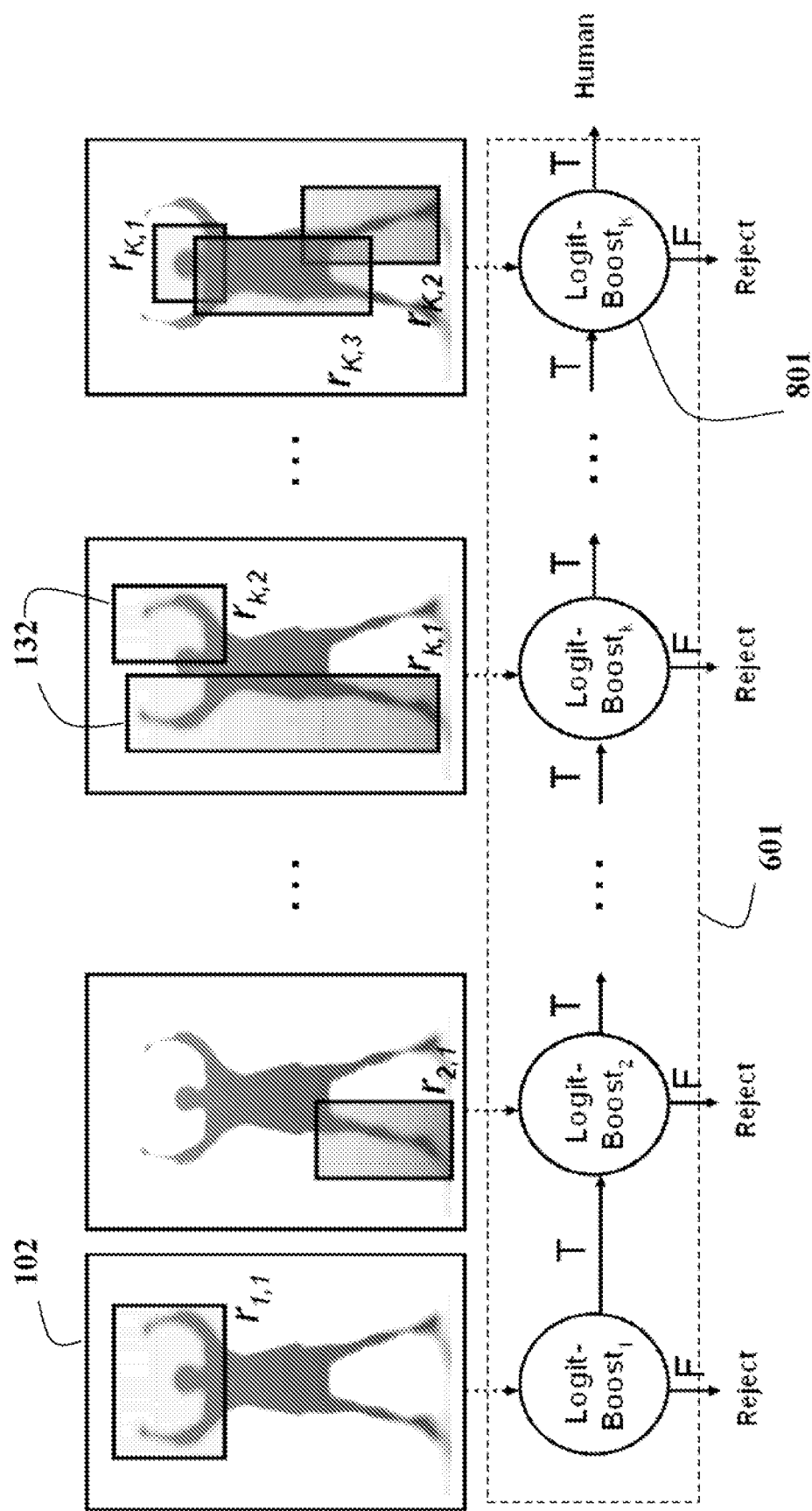
FIG. 8 a block diagram of a cascaded classifier for objects according to an embodiment of the invention.

As shown in FIG. 8, the integral image 102 can be partitioned into multiple regions 321. Locations of windows 320 are generated 325 from the given training regions 321, according shape and size constraints 322. For each window, the low-level features 101 in the window 320 are used to determine a covariance matrix.

We perform sampling and consider subregions r, starting with a minimum size of 1/10 of the width and height of the detection regions R, at all pixel locations. The size of the subwindow r is incremented in steps of 1/10 along the horizontal or vertical directions, or both, until the subregion equals the region, r=R.

Although this approach might be considered redundant due to overlaps, the overlapping regions are an important factor in detection performances. The boosting mechanism, which is described below, enables us to search for the best regions. The covariance descriptors are robust towards illumination changes. We enhance this property to also include local illumination variations in an image.

A possible feature subregion r is inside the detection region R. We determine the covariance of the detection regions $C_R$ and subregion $C_r$ using the integral image representation described above. The normalized covariance matrix is determined by dividing the columns and rows of the covariance matrix $C_r$ with respective diagonal entries of the matrix $C_R$. This is equivalent to first normalizing the feature vectors inside the region R to have zero mean and unit standard deviation, and after that, determining the covariance descriptor of the subregion r.

Using the windows 325, the covariance matrices 311 can be constructed 330 on the Riemannian manifold. The matrices 311 can then be normalized 340 using the windows 320 to produce the high-level features 301.

Projection to Tangent Space

The d×d dimensional symmetric positive definite matrices (nonsingular covariance matrices) $Sym^+_d$, can be formulated as a connected Riemannian manifold and an invariant Riemannian metric on the tangent space of $Sym^+_d$, is $$<y, z> x = tr\left(X^{-\frac{1}{2}} y X^{-1} z X^{-\frac{1}{2}}\right). \quad (4)$$

The exponential map associated to the Riemannian metric $$\exp_X(y) = X^{\frac{1}{2}} \exp\left(X^{-\frac{1}{2}} y X^{-\frac{1}{2}}\right) X^{\frac{1}{2}} \quad (5)$$

is a global diffeomorphism (one-to-one, onto and continuously differentiable mapping in both directions). Therefore, the logarithm is uniquely defined at all the points on the manifold $$\log_X(Y) = X^{\frac{1}{2}} \log\left(X^{-\frac{1}{2}} Y X^{-\frac{1}{2}}\right) X^{\frac{1}{2}}. \quad (6)$$

The operators exp and log are the conventional matrix exponential and logarithm operators. Not to be confused, the operators $\exp_X$ and $\log_X$ are the manifold specific operators, which are also point dependent, $X \in Sym^+_d$. The tangent space of $Sym^+_d$ is the space of d×d symmetric matrices, and both the manifold and the tangent spaces are m=d(d+1)/2 dimensional.

For symmetric matrices, the conventional matrix exponential and logarithm operators can be determined as follows. As is well known, an eigenvalue decomposition of a symmetric matrix is $\Sigma = UDU^T$. The exponential series is $$\exp(\Sigma) = \sum_{k=0}^{\infty} \frac{\Sigma^k}{k!} = U \exp(D) U^T, \quad (7)$$

where exp(D) is the diagonal matrix of the eigenvalue exponentials. Similarly, the logarithm is $$\log(\Sigma) = \sum_{k=1}^{\infty} \frac{(-1)^{k-1}}{k} (\Sigma - I)^k = U \log(D) U^T. \quad (8)$$

The exponential operator is always defined, whereas the logarithms only exist for symmetric matrices with positive eigenvalues, $Sym^+_d$. From the definition of the geodesic given above, the distance between two points on $Sym^+_d$ is measured by substituting Equation (6) into Equation (4)

$$d^2(X, Y) = <\log_X(Y), \log_X(Y)> x \quad (9)$$
$$= tr\left(\log^2\left(X^{-\frac{1}{2}} Y X^{-\frac{1}{2}}\right)\right).$$

We note that an equivalent form of the affine invariant distance metric can be given in terms of the joint eigenvalues of X and Y.

We define an orthogonal coordinate system on the tangent space with the vector operation. The orthogonal coordinates of a vector y on the tangent space at point X is given by a mapping vector $$vec_X(y) = \text{upper}\left(X^{-\frac{1}{2}} y X^{-\frac{1}{2}}\right), \quad (10)$$

where the upper operator refers to the vector form of the upper triangular part of the matrix. The mapping $vec_x$, relates the Riemannian metric of Equation (4) on the tangent space to the canonical metric defined in $\Re^m$.

Intrinsic Mean Covariance Matrices

We improve classification accuracy by determining the intrinsic mean covariance matrix 121. Covariance matrices do not conform to Euclidean geometry. Therefore, we use elliptical or Riemannian geometry. Several methods are known for determining the mean of symmetric positive definite (Hermitian) matrices, such as our covariance matrices (high-level features 301), see Pennec et at, "A Riemannian framework for tensor computing," In Intl. J. of Computer Vision, volume 66, pages 41-66, January 2006, incorporated herein by reference.

A set of points on a Riemannian manifold $\Re^m$ is $\{X_i\}_{i=1...N}$. Similar to Euclidean spaces, the Karcher mean of the points on Riemannian manifold is the point on the manifold $\mathcal{M}$ that minimizes the sum of squared distances $$\mu = \arg\min_{Y \in M} \sum_{i=1}^{N} d^2(X_i, Y), \quad (11)$$

which m our case is the distance metric $d^2$ of Equation (9).

Differentiating the error function with respect to Y and setting it equal to zero, yields $$\mu^{t+1} = \exp_{\mu^t}\left[\frac{1}{N}\sum_{i=1}^{N} \log_{\mu^t}(X_i)\right], \quad (12)$$

which can locate a local minimum of the error function using a gradient descent procedure. The method iterates by determining first order approximations to the mean on the tangent space. We replace the inside of the exponential, i.e., the mean of the tangent vectors, with the weighted mean $$\frac{1}{\sum_{i=1}^{N} w_i} \sum_{i=1}^{N} w_i \log_{\mu^t}(X_i).$$

Figure 5:
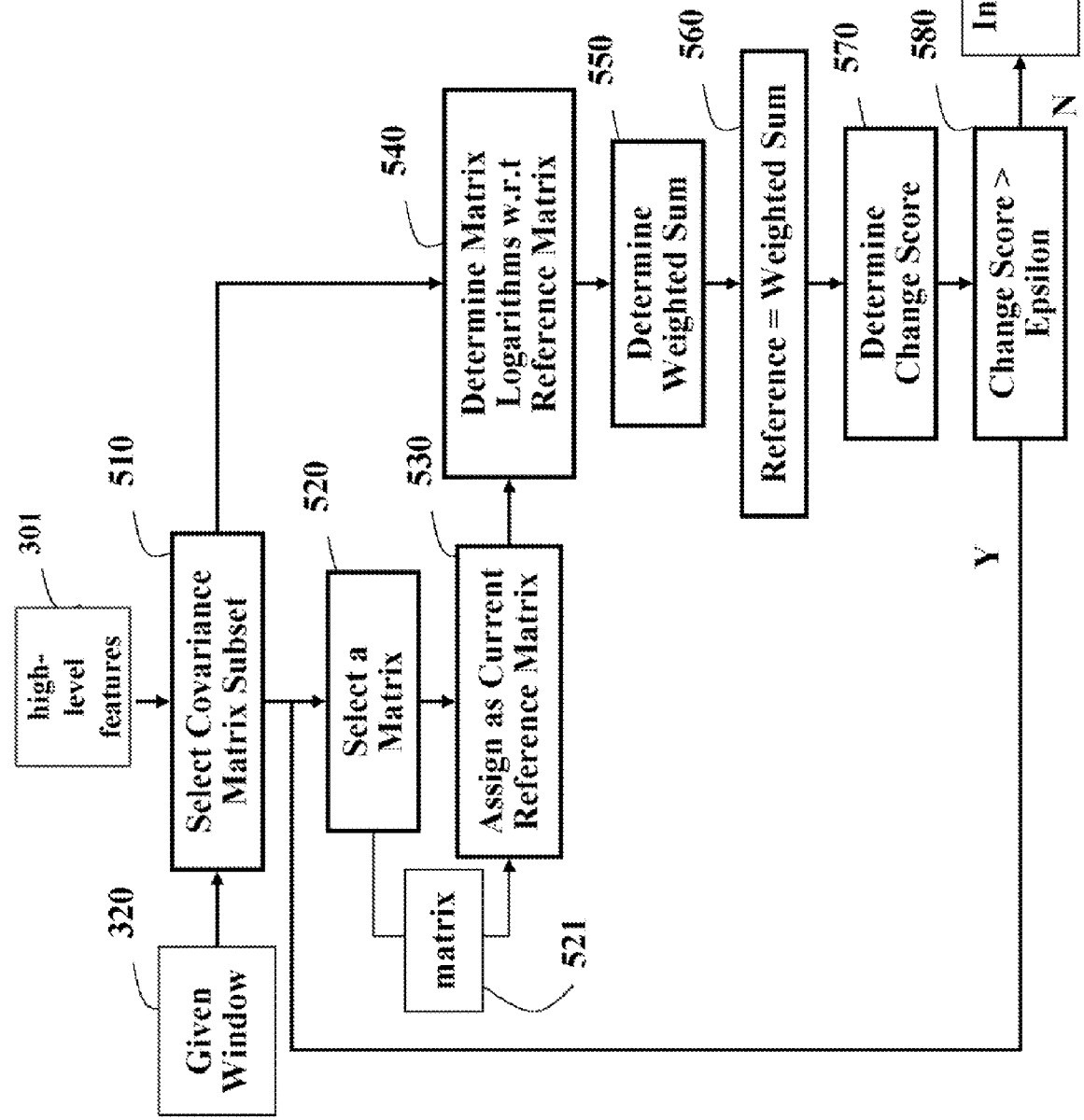
FIG. 5 is a flow diagram of a procedure for determining an intrinsic mean covariance matrix according to an embodiment of the invention.

FIG. 5 shows the selecting step 110 and determining step 120 in greater detail. The intrinsic mean covariance matrix 121 obtained 500 as follows. For a given window 320 and the high-level features 301 therein, a subset of the covariance matrices (high-level features 301) is selected 510. A matrix 521 is selected 520 from the subset 111. The selected matrix 521 is assigned 530 as a current reference matrix.

A mean logarithm with respect to the current reference matrix is determined 540. A weighted sum is determined 550. The weighted sum is compared 560 to the reference matrix, and a change score is determined 570. If the change score is greater than some small threshold $\epsilon$ (Y), then a next matrix is selected and assigned.

Otherwise if not (N), the reference matrix is assigned 590 as the intrinsic mean covariance matrix 121. The intrinsic mean covariance matrix can now be used to map each high-level feature 301 to a corresponding feature vector 131. The feature vectors are used to train the classifier model 410.

Classification on Riemannian Manifolds

A training set of class labels is $\{(X_i, y_i)\}_{i=1...N}$, where $X \in \mathcal{M}$ and $y_1 \in \{0, 1\}$. We want to find a function $F(X)$: $\mathcal{M} \mapsto \{0, 1\}$, which partitions the manifold into two based on the training set of class labels.

Such a function, which partitions the manifold, is a complicated notion compared to a similar partitioning in the Euclidean space. For example, consider the simplest form a linear classifier $\Re^2$. A point and a direction vector on $\Re^2$ define a line that partitions $\Re^2$ into the two parts. Equivalently, on a two-dimensional differentiable manifold, we can consider a point on the manifold and a tangent vector on the tangent space of the point, which define a curve on the manifold via an exponential map. For example, if we consider the image of the lines on a 2D-torus, then the curve can never partition the manifold into two parts.

One method for classification maps the manifold to a higher dimensional Euclidean space, which can be considered as flattening the manifold. However in a general case, there is no such mapping that globally preserves the distances between the points on the manifold. Therefore, a classifier trained on the flattened space does not reflect the global structure of the points.

Classifiers

Figure 4A:
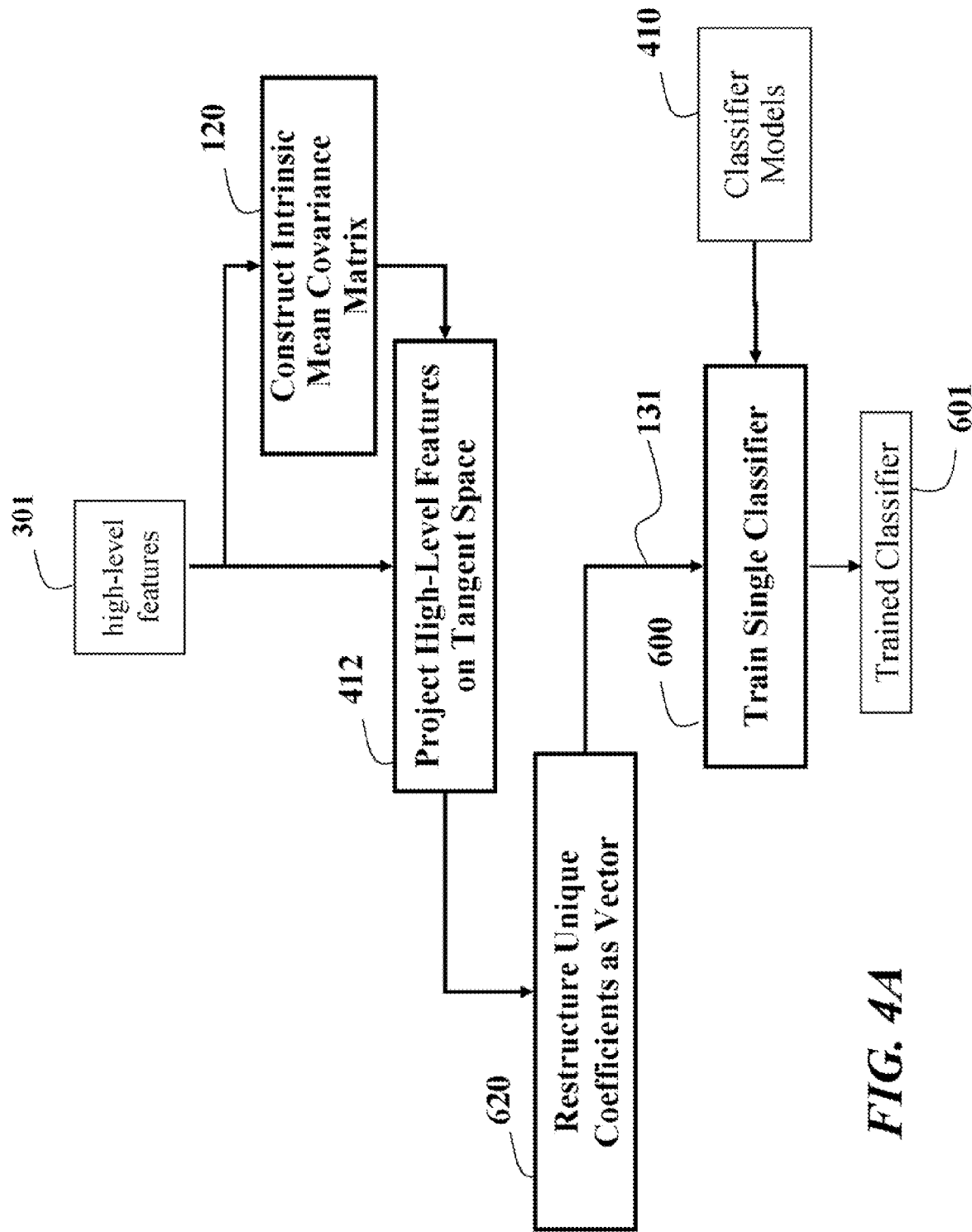
FIGS. 4A-4E are flow diagrams of procedures for training a classifier according to an embodiment of the invention.
Figure 4B:
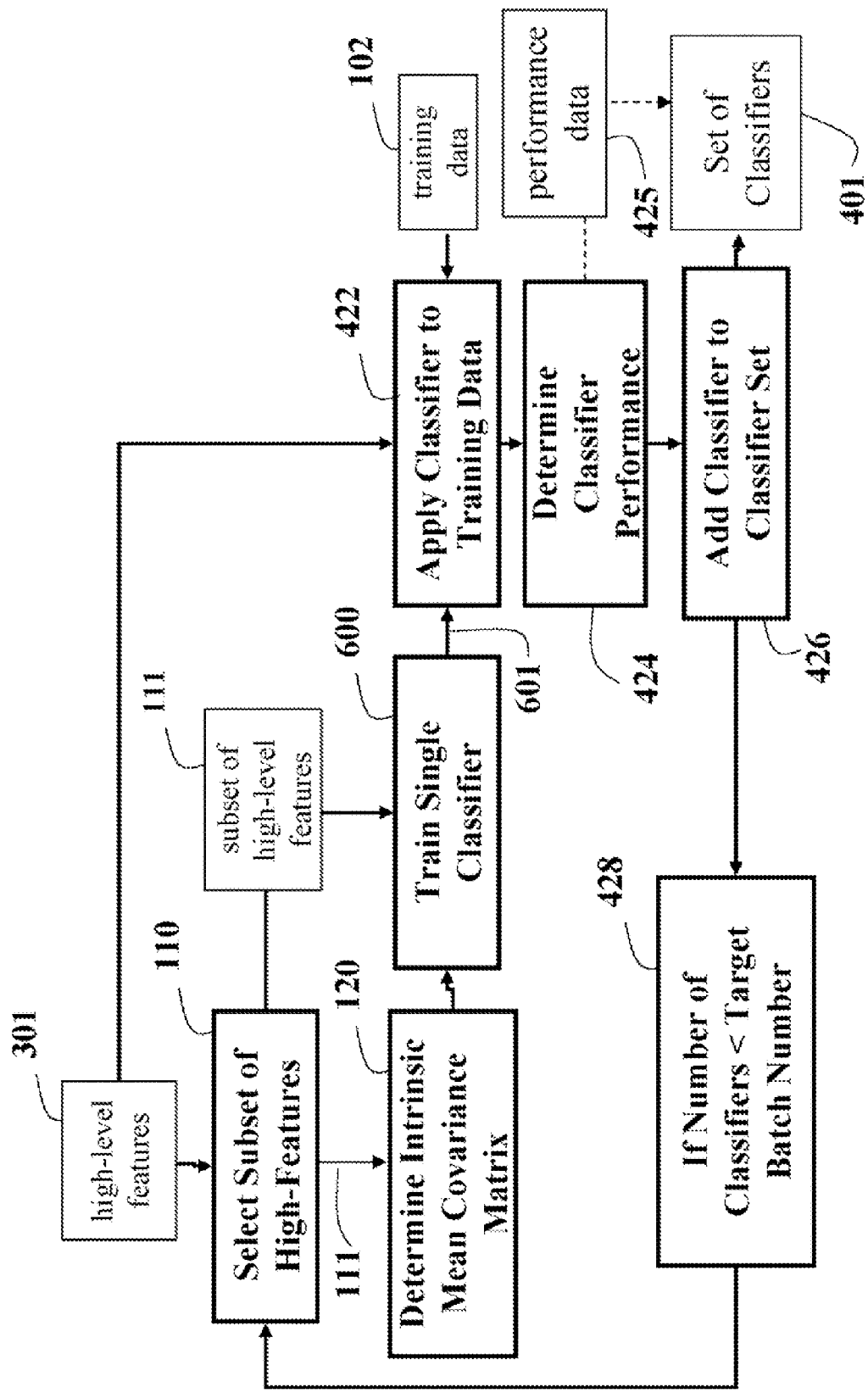
Figure 4C:
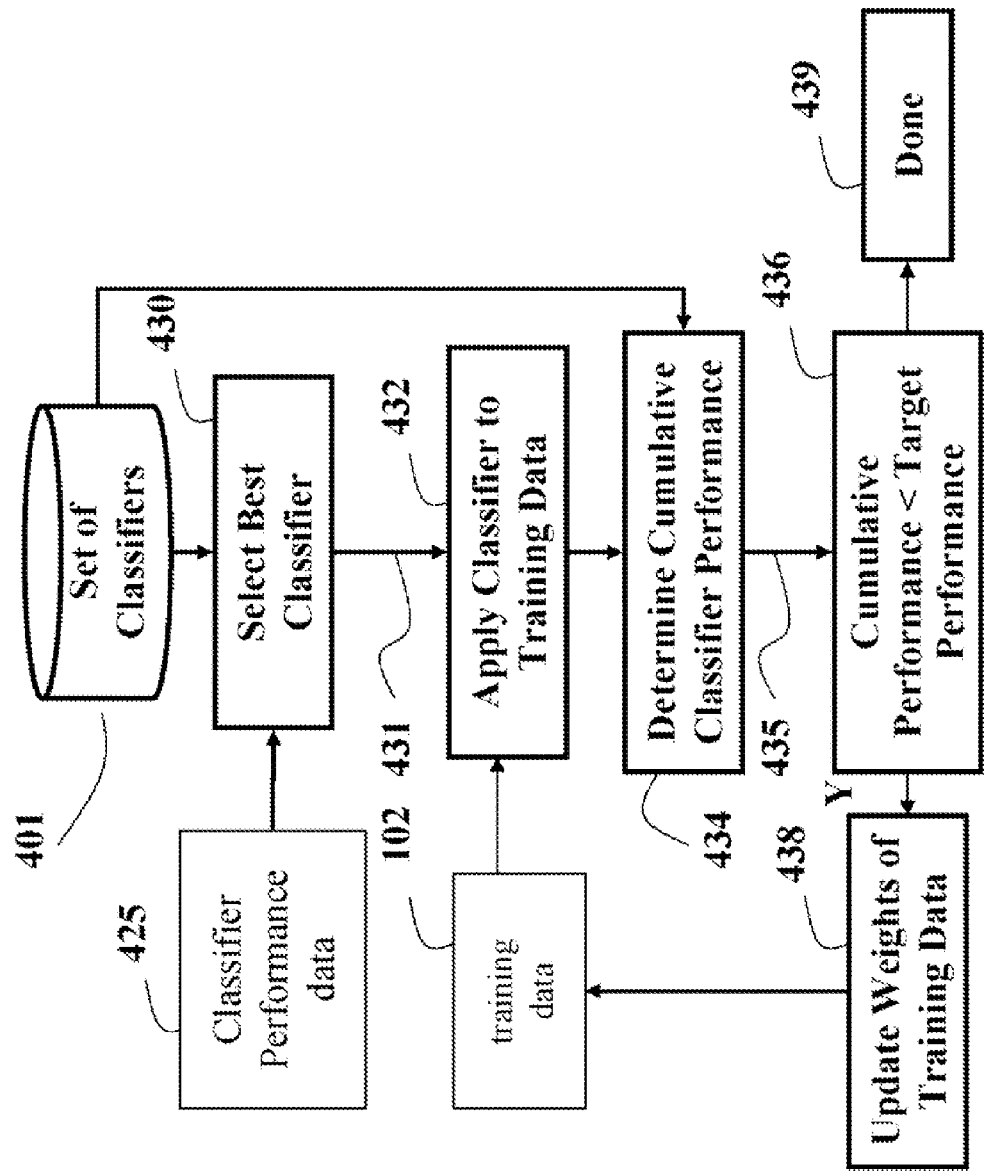
Figure 4D:
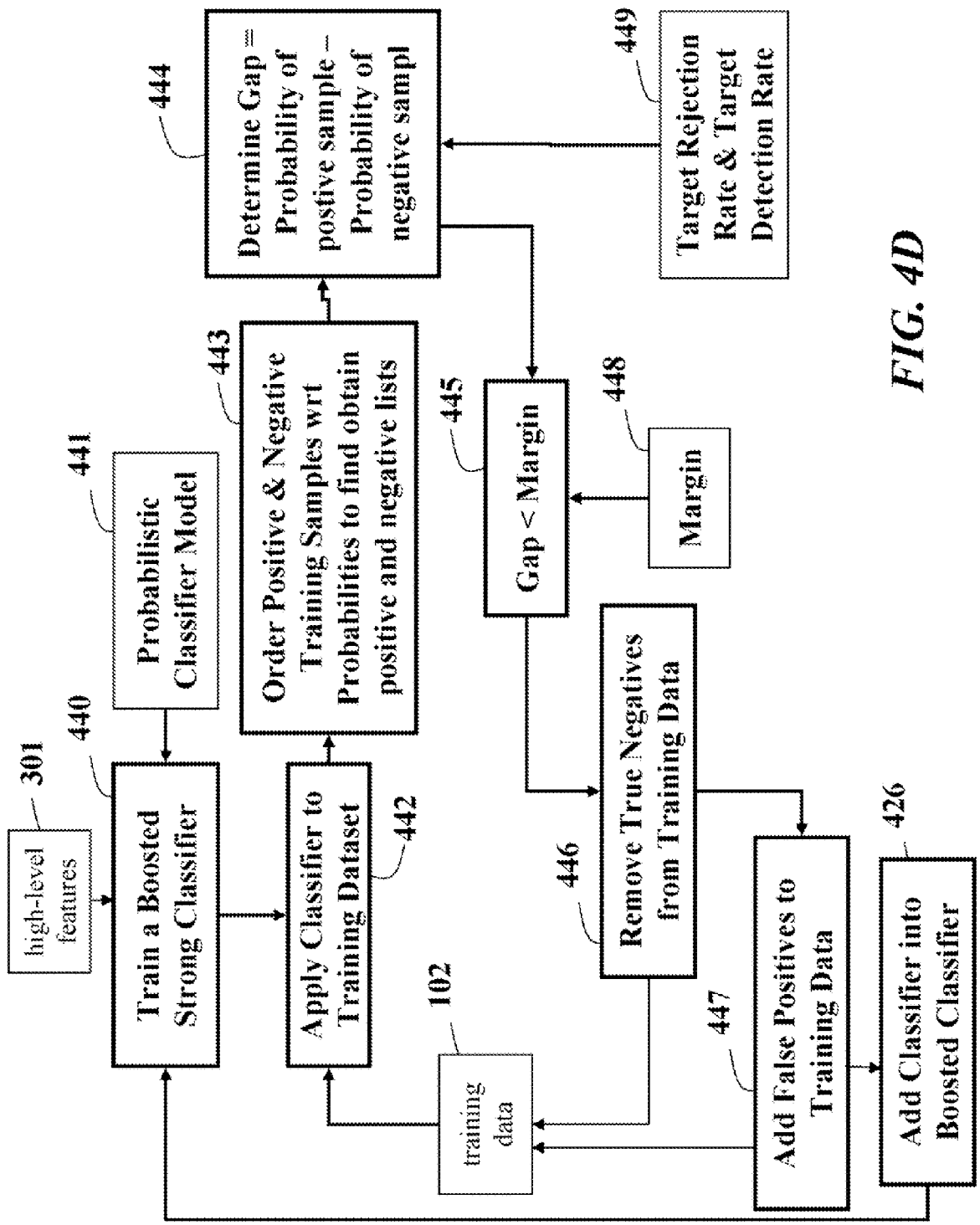

FIGS. 4A-4B show alternative embodiments for training the classifier 601. FIG. 4A shows a single classifier method. FIGS. 4B-4C show a boosted classifier method. FIG. 4D shows a margin cascade boosted classifier method.

Single Classifier

As shown in FIG. 4A for the single classifier 601 is trained as follows. The intrinsic mean covariance matrix is determined 120 from the high-level features 103. The high-level features 301 are projected 412 on a tangent space using the intrinsic mean covariance matrix 121 to map the high-level features. Unique coefficients of the matrix, after the projection, is reconstructed 620 as the feature vector 131. Using a selected classifier model 410 from available classifier models, the selected classifier is then trained using the feature vectors 131.

Boosted Classifier

FIG. 4B shows the steps for training a boosted classifier. A subset 111 of the high-level features 103 is selected 110. The intrinsic mean covariance matrix is determined 120 from the selected subset of high-level features 111. These features are used to train 600 a selected single classifier to produce a trained classifier 601.

The trained classifier is applied 422 to a portion of the training data 102, and a performance 125 of the classifier can be determined 424. If the performance is acceptable, then the classifier is added 426 to the set of classifiers 401.

Additional classifiers can then be evaluated, via step 428, until the desired number of classifiers have been accumulated in the set of classifiers 401. It should be noted, that a different subset of the high-level features can be selected for each classifier to be trained. In this case, an intrinsic mean covariance matrix is determined for each selected subset of high-level features.

For the boosting, the set of classifiers 401 can be further evaluated as shown in FIG. 4C. Using the performance data 425, a best classifier 431 is selected 430. The best classifier 431 is applied 432 to a portion of the training data 102 and a cumulative performance 435 is determined 434. If the cumulative performance 435 is less than a predetermined target performance, in step 436, then the weights of the training data are updated 438, and another classifier can be trained. Otherwise, the training of the boosted classifier is done 439.

We describe an incremental approach by training several weak classifiers on the tangent space and combining the weak classifiers through boosting. We start by defining mappings from neighborhoods on the manifold to the Euclidean space, similar to coordinate charts. Our maps are the logarithm maps, $\log_X$, that map the neighborhood of points X to the tangent spaces $T_X$. Because this mapping is a homeomorphism around the neighborhood of the point, the structure of the manifold is preserved locally. The tangent space is a vector space, and we train the classifiers on this space. The classifiers can be trained on the tangent space at any point on the manifold. The mean of the points minimizes the sum of squared distances on the manifold. Therefore, the mean is a good approximation up to a first order, During each iteration, we determine the weighted mean of the points, where the weights are adjusted through boosting. We map the points to the tangent space at the mean and train a weak classifier on this vector space. Because the weights of the samples, which are misclassified during earlier stages of boosting increase, the weighted mean moves towards these points producing more accurate classifiers for these points. This approach minimizes the approximation error through averaging over several weak classifiers.

LogitBoost on Riemannian Manifolds

We start with brief description of the conventional LogitBoost method on vector spaces, J. Friedman, T. Hastie, and R. Tibshirani, "Additive logistic regression: A statistical view of boosting," Ann. Statist., 28(2):337-407, 2000, incorporated herein by reference.

We consider the binary classification problem, $y_i \in \{0, 1\}$. The probability of the point x being in class 1 is represented by $$p(x) = \frac{e^{F(x)}}{e^{F(x)} + e^{-F(x)}} \quad F(x) = \frac{1}{2}\sum_{l=1}^{L} f_l(x). \quad (13)$$

The LogitBoost method trains the set of regression functions $\{f_l(x)\}_{l=1 \ldots L}$ (weak functions) by minimizing the negative binomial log-likelihood of the data $l(y, p(x))$ as $$-\sum_{i=1}^{N} [y_i \log(p(x_i)) + (1 - y_i)\log(1 - p(x_i))] \quad (14)$$

through Newton iterations. The LogitBoost method fits a weighted least square regression, $f_l(x)$ of training points (features) $x_i \in \Re^m$ to response values $z_i \in \Re$ with weights $w_i$.

Our LogitBoost method on Riemannian manifolds is different to the conventional LogitBoost at the level of weak functions. In our method, the domains of the weak functions are in $\mathcal{M}$, such that $f_l(X): \mathcal{M} \mapsto \Re$. Following the description above, we train the regression functions in the tangent space at the weighted mean of the points on the manifold. We define the weak functions as $$f_l(X) = g_l(vec_{\mu_l}(\log_{\mu_l}(X))) \quad (15),$$

and train the functions $g_l(x): \Re^m \mapsto \Re$, and the weighted mean of the points $\mu_l \in \mathcal{M}$. Notice that, the mapping vector of Equation (10) gives the orthogonal coordinates of the tangent vectors.

Pseudo-code for the method is shown in FIG. 7. The steps marked with (*) are different from the conventional LogitBoost method. For functions $\{g_l\}_{l=1 \ldots L}$, is possible to use any form of weighted least squares regression such as linear functions, regression stumps, etc., because the domains of the functions are in $\mathcal{M}$.

Input is a training set of class labels is $\{(X_i, y_i)\}_{i=1 \ldots N}$, where $X \in \mathcal{M}$ and $y_i \in \{0, 1\}$, and we start with weights $w_i$. Then, we repeat l=1 . . . L the following steps. We compute the response values $z_i$ and weights $w_i$. Then, we compute the weighted mean of the points $\mu_l$. We map the data points to the tangent space at $\mu_l$. We fit the function g(x) by the weighted least-square regression of $z_i$ to $x_i$ using weights $w_i$, and update F(X) where $f_l$ is defined in Equation (15) and p(X) is defined in Equation (13). The method outputs the classifier sign $$[F(X)] = \text{sign}\left[\sum_{l=1}^{L} f_l(X)\right].$$

Boosted Classifier with Adjustable Margin

Figure 4E:
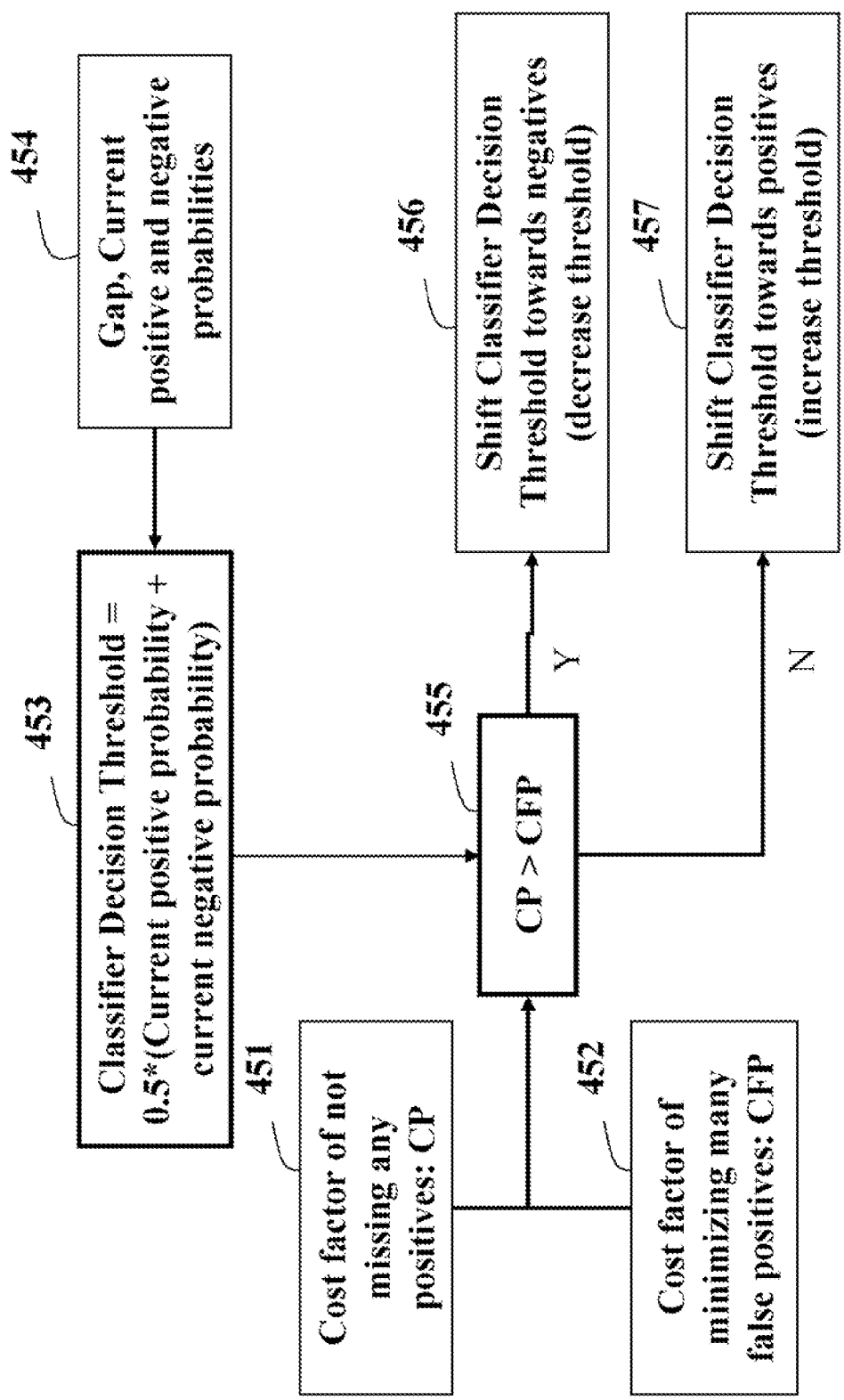

For a margin cascade classifier as shown in FIGS. 4D and 4E, a probabilistic classifier model 441 is used to train 440 a strong boosted classifier using the high-level features 301, as described above. The strong trained boosted classifier is then applied 442 to a portion of the training data. 102.

Positive and negative samples of the training data are ordered 443 according to their probabilities to obtain two lists; a positive list for positive samples and a negative list for the negative samples.

Then, the probability of the particular positive example in the positive list that corresponds to the positive detection rate is obtained. This positive sample is assigned as the current positive probability. Similarly, the current negative probability is found using the negative list and the negative detection rate.

Then, the current negative probability is subtracted 444 from the current positive probability to obtain a current gap. A classifier decision threshold is set 453 to the half of the summations of the current positive and current negative probabilities, see FIG. 4E described below in greater detail. Two cost factors are defined. A cost of not missing any positive samples (CP) 451, and cost of minimizing false positive samples (CFP) 452. A margin 448 for classification is set by a user or adjusted based on the detection performance of the classifiers in the cascade.

The margin is used to determine the classifier decision threshold, using the gap and probabilities of target detection and rejection rates 454, based on a target margin 448, and target detection and rejection rates 449. The result can be used to remove 446 true negative samples from the training data 101, and to add 447 false positives as negative training data.

Adjusting the Margin

A size of the margin determines the speed and accuracy of the classifier. If the margin is large, in step 455, based on the CP and CFP costs, then the speed is fast, but the results can be less accurate. Decreasing the size of the margin, slows down the classification but increases the accuracy of the results. If it is desired to not miss any positive samples, then the threshold is shifted 456 towards the negative samples, i.e., the threshold is decreased. If it is desired to not detect any false positive samples, then the threshold is shifted 457 towards positive samples away from the negative training samples, i.e., the threshold value is increased.

We repeat adding 426 classifiers to the boosted classifier, as described above, until the current gap is greater than the margin in step 445.

Cascade of Rejectors

We employ a cascade of rejectors and a boosting framework to increase the speed of classification process. Each rejector is a strong classifier, and consists of a set of weighted linear weak classifiers as described above. The number of weak classifiers at each rejector is determined by the target true and false positive rates. Each weak classifier corresponds to a high-dimensional feature and it splits the high dimensional input space with a decision boundary (hyper plane, etc). Each weak classifier makes its estimation based on a single high-dimensional feature from the bag of high-dimensional features. Boosting works by sequentially fitting weak classifiers to reweighted versions of the training data. Using Gentle-Boost, we fit an additive logistic regression model by stage-wise optimization of the Bernoulli log-likelihood.

Human Detection using Cascade of Rejectors

FIG. 8 shows one embodiment of our cascaded classifier. For human detection we combine, e.g., K=30, of our Logit-Boost classifiers 801 on $Sym^+_8$ with a rejection cascade. The weak classifiers $\{g_l\}_{l=1 \ldots L}$ are linear regression functions trained on the tangent space of $Sym^+_8$. The tangent space is an m+36 dimensional vector space. Let $N_{pi}$ and $N_{ni}$ be the number of positive and negative images in the training set. Because any detection region or window sampled from a negative image is a negative sample, it is possible to generate more negative examples than the number of negative images.

Assume that we are training the $k^{th}$ cascade level. We classify all the possible detection regions on the negative training images with the cascade of the previous (k−1) classifiers. The samples m, which are misclassified, form the possible negative set (samples classified as positive). Because the cardinality of the possible negative set is very large, we sample $N''$=10000 examples from this set as the negative examples at cascade level k. At every cascade level, we consider all the positive training images as the positive training set. There is a single human at each of the positive images, so $N_p=N_{pi}$.

A very large number of covariance descriptors can be determined from a single detection region. It is computationally intractable to test all of the descriptors. At each boosting iterations of the $k^{th}$ LogitBoost level, we sample 200 subregions among all the possible subregions, and construct normalized covariance descriptors as described above. We train the weak classifiers representing each subregion, and add the best classifier which minimizes negative binomial log-likelihood to the cascade level k.

Each level of cascade detector is optimized to correctly detect at least 99.8% of the positive examples, while rejecting at least 35% of the negative examples. In addition, we enforce a margin constraint between the positive samples and the decision boundary. The probability of a sample being positive at cascade level k is $p_k(X)$, evaluated using Equation (13).

The positive example that has the $(0.998N_p)^{th}$ largest probability among all the positive examples is $X_p$. The negative example that has the $(0.35N_n)^{th}$ smallest probability among all the negative examples $X_n$. We continue to add weak classifiers to cascade level k $p_k(X_p)-p_k(X_n) > th_b$. We se the threshold $th_b$=0.2.

When the constraint is satisfied, a new sample is classified as positive by cascade level k if $p_k(X) > p_k(X_p) - th_b > p_k(X_n)$ or equivalently $F_k(X) > F_k(X_n)$. With our method, any of the positive training samples in the top 99.8 percentile have at least $th_b$ more probability than the decision boundary. The process continues with the training of $(k+1)^{th}$ cascade level, until k=K.

This method is a modification of our LogitBoost classifier on Riemannian manifolds described above. We determine the weighted means of only the positive examples, because the negative set is not well characterized for detection tasks. Although it rarely happens, if some of the features are totally correlated, there will be singularities in the covariance descriptor. We ignore those eases by adding very small identity matrix to the covariance descriptor.

Object Detection with Motion Cues in Covariance Descriptors

Figure 6:
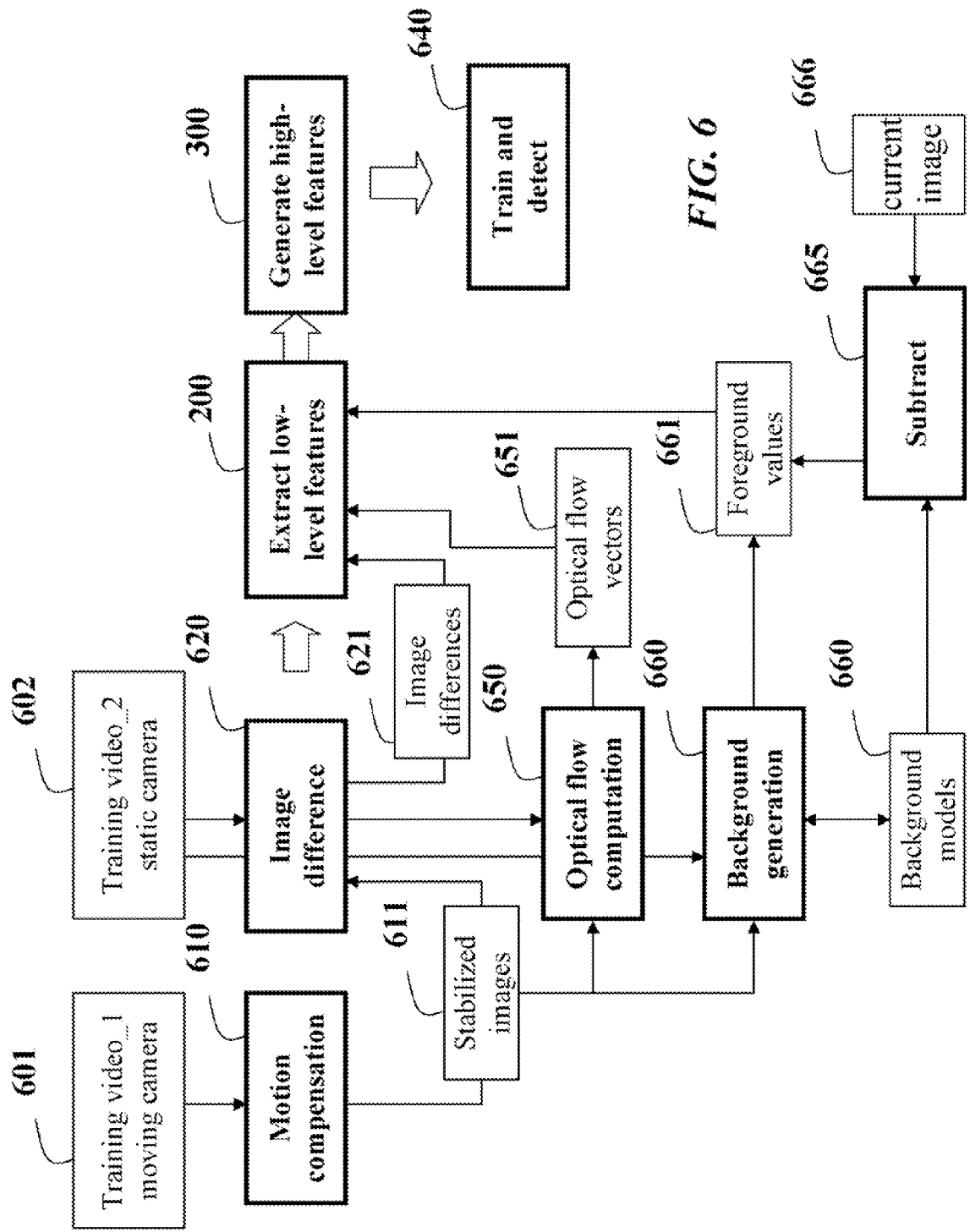
FIG. 6 is a flow diagram of details of a procedure for determining high-level features from motion cues according to an embodiment of the invention.

FIG. 6 shows a procedure for determining high-level features from motion cues according to an embodiment of the invention. The features can be used for training a classifier as described herein, and for object detection.

Covariance descriptors, which we adapt for object detection in images according to embodiments of our invention, can also include motion cues that are extracted from the video data. The motion cues can be provided by another sensor, or can be determined by analyzing the video data itself. The pixel-wise object motion information is incorporated as a low-level feature.

In case of system with a moving camera, the apparent motion in the video can be due to object and/or camera motion. Therefore, we use a first training $video_{13}$ 601 from moving camera, and a second training video_2 602 from a static camera.

The camera motion in the first training video 601 is compensated 610 to obtain the motion due to the objects only. This is done by stabilizing or aligning the consecutive video images. Image alignment gives the camera motion either as a parametric (affine, perspective, etc.) global motion model, or as a non-parametric dense motion field. In both cases, the consecutive images are aligned. This results in stabilized images 611. Using the stabilized images, 611 the moving objects in the scene are found as the regions that have high motion after the compensation step 611.

For static camera systems, there is no camera motion in the second video 602. Thus, no compensation is required. Any motion present is due to object motion. Therefore, we generate and maintain 660 a statistical background model 662.

We use different motion cues. A motion cue is an additional low-level feature when we determine the high-level features 300.

A first set of motion, cues is obtained from a foreground 661. Using the input images (stabilized images 611 in case of moving cameras), the background model 662 is maintained 660. The changed part of the scene, which is called the foreground 661, is determined by comparing and subtracting 665 the current image 666 from the background models 660. A foreground pixel value corresponds to the distance between the current image pixel and the background models for that pixel. This distance can be thresholded. We use these pixel-wise distances as a first set of motion cues.

A second set of motion cues is obtained by the consecutive image differences 620. A number of difference images 621 are determined by subtracting the current image from one or multiple of the previous images, that are the motion compensated (stabilized) images 611 in case of a moving camera system. The subtraction gives the intensity distance at a pixel. Instead of the intensity distance, other distances, for instance, gradient magnitude distance, orientation difference, can also used.

A third set of motion features is computed by determining 650 an optical flow 651 between the current and previous (stabilized) images 611. The optical flow determination produces a motion vector at every pixel. The motion vectors, which include the vertical and horizontal components of the optical flow vector, or the magnitude and orientation angles of the optical flow vector, are then assigned as the pixel-wise motion cues. Alternatively, a motion vector for each pixel is determined by block-matching or other methods instead of the optical flow.

For moving object detection, we include the motion cues among the low-level features in the aforementioned mapping function Φ(I, x, y). The low-level feature can be used to generate 300 high-level features as described above. Then, the high-level features obtained from training data can be used to train the classifier 601, while the high-level features obtained in a similar manner from test data can be used to detect moving objects using the trained classifier.

Testing

During classification 140 of test data 104, low-level features are extracted and used to generate high-level features, as described above. The high-level features are eventually mapped to feature vectors, as described above, for classification 140. The classification assigns the labels 105 to the test data 104, e.g. human or not.

Although, the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

Effect of the Invention

The embodiments of the invention provide a method for detecting humans in images utilizing covariance matrices as object descriptors and a training method the Riemannian manifolds. The method is not specific to $Sym^+_d$, and can be used to train classifiers for points lying on any connected Riemannian manifold.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for constructing a classifier from training data and detecting moving objects in test data using the classifier, comprising the steps of:
   generating high-level features from low-level features extracted from training data, the high-level features being positive definite matrices in a form of an analytical manifold;
   selecting a subset of the high-level features;
   determining an intrinsic mean matrix from the subset of the selected high-level features;
   mapping each high-level feature to a feature vector onto a tangent space of the analytical manifold using the intrinsic mean matrix;
   training an untrained classifier with the feature vectors to obtain a trained classifier;
   generating test high-level features from test low-level features extracted from test data, the test high-level features being the positive definite matrices in the form of the analytical manifold, in which the training and test data are in a form of images, and wherein the low-level features are derived from pixel intensities, and the high-level features are covariance matrices generated from the pixel intensities features; and
   classifying the test high-level features using the trained classifier to detect moving objects in the test data.

2. The method of claim 1, in which the training and test data are in a form of a video.

3. The method of claim 1, in which the low-level features are derived from colors in the images.

4. The method of claim 2, in which the low-level features are derived from colors, and pixel motion vectors, optical flow, and intensity and gradient distances in the video.

5. The method of claim 1, in which the moving object is a human.

6. The method of claim 1, in which the high-level features are determined from motion cues.

7. The method of claim 6, in which the motion cues are sensed by motion sensors.

8. The method of claim 6, in which the motion cues are obtained from the training data.

9. The method of claim 6, in which the motion cues are obtained from the test data.

10. The method of claim 6, in which motion cues are object motion that are compensated from joint object and camera motion using the camera motion.

11. The method of claim 6, in which the motion cues use a background model.

12. The method of claim 6, in which the motion cues consider optical flow.

13. The method of claim 6, in which the training data are obtained from a sequence of frames and the motion cues consider differences between the frames.

14. The method of claim 6, in which the high-level features comprise a manifold.

15. The method of claim 1, in which the classifier is a boosted classifier.

16. The method of claim 14, in which the classifier is a LogitBoost boosted classifier applied on the manifold.

17. The method of claim 16, and in which the training of the LogitBoost classifier further comprises:
    assigning identical weights to the high-level features;
    assigning zero to a classifier decision function;
    assigning equal values to a probability of being in a given class of the classifier; and
repeating the following steps until a predetermined goal is achieved:
    determining response values and weights of the high-level features;
    determining a weighted mean on the manifold;
    mapping the high-level features on to a tangent space using the weighted mean;
    fitting a boundary function as a weak classifier by a weighted least-square regression using the weights and mapped features;
    updating the classifier decision function by a score of the weak classifier;
    updating the probability of being in a given class; and
    determining a result of the LogitBoost boosted classifier as a sign of aggregated scores.

18. The method of claim 17, in which the goal is a target performance score.

19. The method of claim 17, in which the goal is a predetermined number of weak classifiers included in the boosted classifier.

20. The method of claim 16, in which the LogitBoost boosted classifier is a set of cascaded classifiers containing a binary tree of the LogitBoost boosted classifier applied on a manifold.

21. The method of claim 1, in which the high-level features are obtained from symmetric regions in images of the training data for moving objects having symmetrical appearances.

* * * * *